United States Patent

[11] 3,591,203

| [72] | Inventor | Helmut Steiner<br>Wiehl, Germany |
|---|---|---|
| [21] | Appl. No | 821,036 |
| [22] | Filed | May 1, 1969 |
| [45] | Patented | July 6, 1971 |
| [73] | Assignee | Bergische Achsenfabrik Fr. Kotz & Sohne<br>Wiehl Chlerhammer, Germany |
| [32] | Priority | May 2, 1968 |
| [33] | | Germany |
| [31] | | P 17 55 368.3 |

[54] HYDRAULIC AUTOMATIC STEERING ARRANGEMENT FOR PULLED VEHICLES
12 Claims, 8 Drawing Figs.

| [52] | U.S. Cl. | 280/426, 280/98, 280/443 |
|---|---|---|
| [51] | Int. Cl. | B62d 13/02 |
| [50] | Field of Search | 280/426, 443, 444, 78 |

[56] References Cited
UNITED STATES PATENTS

| 2,152,511 | 3/1939 | Vanderwerf | 280/443 |
| 2,167,943 | 8/1939 | Fox | 280/426 X |

FOREIGN PATENTS

| 68,175 | 7/1951 | Netherlands | 280/443 |
| 396,652 | 1/1966 | Switzerland | 280/426 |
| 709,752 | 8/1941 | Germany | 280/426 |
| 948,629 | 1/1949 | France | 280/426 |

Primary Examiner—Leo Friaglia
Attorney—Walter Becker

ABSTRACT: A steering system for steerable rear wheels of a trailer vehicle in which receiving fluid motors are connected to the said rear wheels to cause turning thereof while a sending piston cylinder arrangement is connected in circuit with the fluid motors. The piston is engaged by a cam to move the piston in the cylinder to displace fluid to and from the fluid motors and one of the cylinder and cam is fixed to the trailer frame while the other thereof is fixed to a member pivoted to the trailer frame which is adapted for connection to a towing vehicle so as to turn with the towing vehicle.

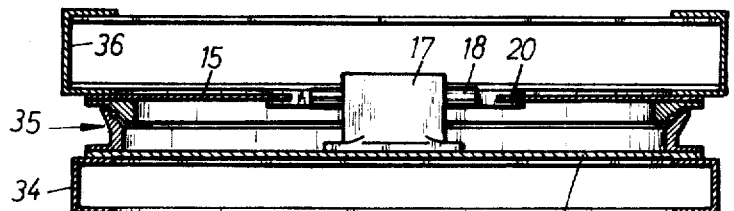
Fig. 6
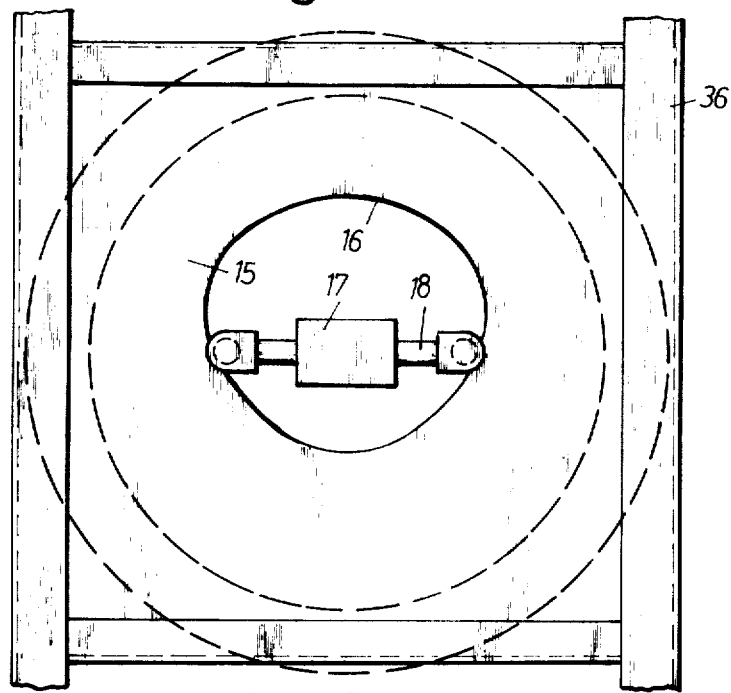
Fig. 7
Fig. 8
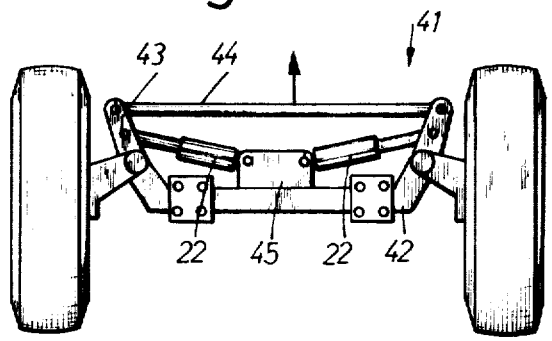

3,591,203

HYDRAULIC AUTOMATIC STEERING ARRANGEMENT FOR PULLED VEHICLES

The present invention relates to a hydraulic automatic steering arrangement for pulled vehicles with a transmitting cylinder arranged on the truck or pivot mounting or the saddle coupling, and with receiving cylinders acting upon a rear steering axle.

The automatic steering for pulled vehicles is an important contribution to the traffic safety because the required overall width and the required truck width of a truck with two-axle or three-axle trailers are considerable. When considerable width is required in a curve, this will impair the traffic safety wherever the street cannot be widened correspondingly. In an effort to reduce the required width, trailers have become known which are equipped with an all-wheel steering or with rear axle steering. In order on one hand to reduce the tire wear by sliding and on the other hand to reduce the required track width, various suggestions have been made heretofore for so-called self-steering or automatically steered rear axle units. With arrangements of this type, the angle of lock of the saddle coupling or shaft or pole on one hand and of the rear steering axle on the other hand are automatically made dependent on each other.

The heretofore known mechanical automatic steering systems which primarily comprise linkage systems have first of all the drawback that considerable steering forces have to be employed for the purely mechanical transmission of the steering movement. When employing a hydraulic auxiliary steering mechanism, additional devices are necessary which when filling make the trailer unmaneuverable. The foremost drawback of the heretofore known mechanical automatic steering systems consists, however, in that the angle of lock for the pivot mounting or truck or the saddle coupling is relatively small.

There has also become known a hydraulic automatic steering arrangement for a low loading truck the wheel pairs of which on the right-hand vehicle side and left-hand vehicle side are journaled on separate axles and in their central area are pivotable about vertical axes while resting against the vehicle frame. The steering movement of two transmitting cylinders arranged on the shaft is respectively transmitted to each receiving cylinder respectively associated with each wheel pair. With this known hydraulic automatic steering arrangement, below the shaft or pole there is provided a cam disc which is fixedly connected to the axle and which is frictionally connected to the piston rod of the vertically arranged transmitting cylinders. The two transmitting cylinders are, through pipelines, in communication with the receiving cylinders respectively associated with said wheel pairs. This known hydraulic automatic steering arrangement has the drawback that it is rather expensive and requires a considerable number of parts in its basic structure because below the cam disc arranged on the shaft or pole, two transmitting cylinders, and on each separately suspended wheel pair, one receiving cylinder each has to be arranged. A further drawback consists in that the arrangement comprising the cam disc and the transmitting cylinders vertically arranged therebelow requires considerable space for the control impulse. This known hydraulic automatic steering arrangement, therefore, in view of its basic expensive and space-requiring structure can be built into such vehicle trucks only which are specifically designed for this particular automatic steering arrangement.

Starting with the heretofore known hydraulic automatic steering arrangements for pulled vehicles with a transmitting cylinder on the pivot mounting or on the saddle coupling and with receiving cylinders acting upon the rear steering axle, the problem underlying the present invention has been solved in conformity with the present invention by arranging the transmitting cylinder perpendicularly to the axis of rotation within a cam disc and by connecting the transmitting cylinder to the pivot mounting or a coupling plate of the saddle coupling of the trailer, while the cam disc is connected to the frame of the trailer.

The arrangement according to the present invention of transmitting cylinders and cam disc on the front axle of the trailer or on the saddle coupling makes it possible with a practical embodiment of the invention to produce the control cam of the cam disc in the form of two arc sections with differently large radii and to form stroke curve or cam sections which form an image to each other and establish a continuous connection. The thus designed control curve or cam has the drawback that the maximum possible angle of lock of a pivot mounting may theoretically amount to even 360°, while the control stroke determined by the inclination of the stroke cam sections will for the rear steering axle amount to only from about 10° to 30°. To this end, the said stroke cam sections preferably define a center angle of approximately 80°, whereas the remaining 200° are defined by the circular arc sections which, so to speak, represent the lost motion of the hydraulic automatic steering arrangement.

It has furthermore been found advantageous to design the transmitting cylinder as a double-acting cylinder, and to provide the ends of the two piston rods with fork-shaped heads so that by means of rollers they can engage the control cam surface and can roll thereon.

With a semitrailer having a saddle coupling comprising a coupling plate, sliding plate, follower wedge and kingpin, the arrangement of the automatic linkage according to the invention, is preferably such that the transmitting cylinder and the kingpin are connected to the sliding plate concentrically with regard to the axis of rotation. The sliding plate may, by means of a ball bearing, be rotatably journaled on the frame of the trailer while the cam disc and the upper ring of said ball bearing by means of a common holding plate are connected to the frame of the trailer.

With a trailer having a pivot pin comprising a shaft with auxiliary frame and a turntable, the arrangement provided in conformity with the invention with a hydraulically operable automatic steering system may be such that the transmitting cylinder by means of the rotatable ring is connected to the auxiliary frame while the cam disc is connected to the upper rotatable ring at the frame of the trailer.

The two transmitting cylinders at the rear steering axle may, for instance in a manner known per se, be arranged between the lower rotatable ring and the vehicle frame, whereas with a follower axle with axle journal steering mechanism they are advantageously arranged between the axle body and the steering levers.

With a preferred embodiment f the automatic steering arrangement according to the invention, the volume of the transmitting cylinder and of the receiving cylinder have the ratio of 2:1. Furthermore, it is advantageous to build into the control conduit for the pressure oil, a storage container with a gas-filled compensating container which is preferably filled with compressed air from the braking installation. From this compensating container, leakage oil is replaced and the oil may be held at the same level in the hydraulic system.

It is, therefore, an object of the present invention to provide a hydraulic automatic steering arrangement for pulled vehicles, which will overcome the above-mentioned drawbacks.

It is another object of this invention to provide a hydraulic automatic steering arrangement for pulled vehicles which can without additional structure be built into heretofore known trailers equipped with a pivot mounting or truck or saddle coupling.

It is still another object of this invention to provide an automatic steering arrangement of the type set forth in the preceding paragraph in which the automatic steering arrangement will be so designed that the maximum angle of lock will no longer be dependent on devices of the automatic steering arrangement but only on the dimensions of the tractor, of the trailer, and of the respective upper structure.

These and other objects and advantages of the invention will appear more clearly from the following specification in connection with the accompanying drawings, in which:

FIG. 6 represents on a larger scale than FIG. 4 a section taken along the line VI-VI of FIG. 4.

FIG. 7 shows a top view of FIG. 6.

FIG. 8 is a top view of a servo-steering axle with axle journal steering to illustrate the rear receiving cylinder between the axle body and the steering levers.

Figure 1:
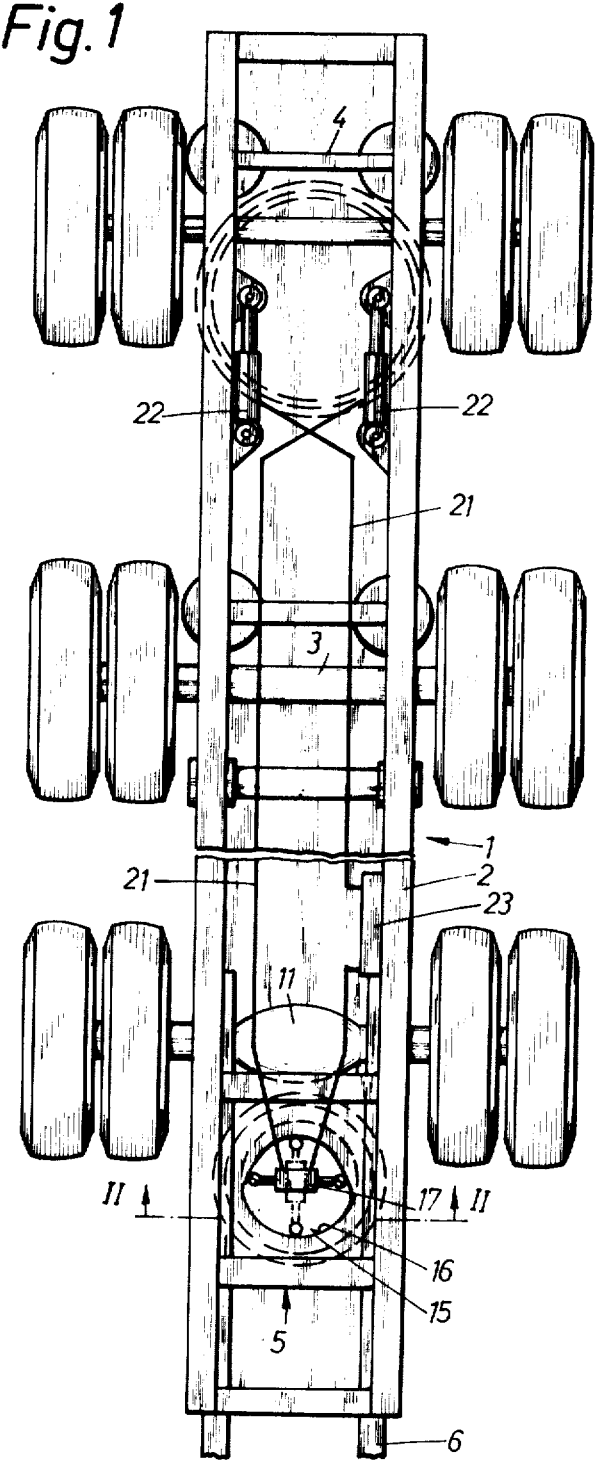
FIG. 1 shows the top view of a semitrailer without upper structure.
Figure 2:
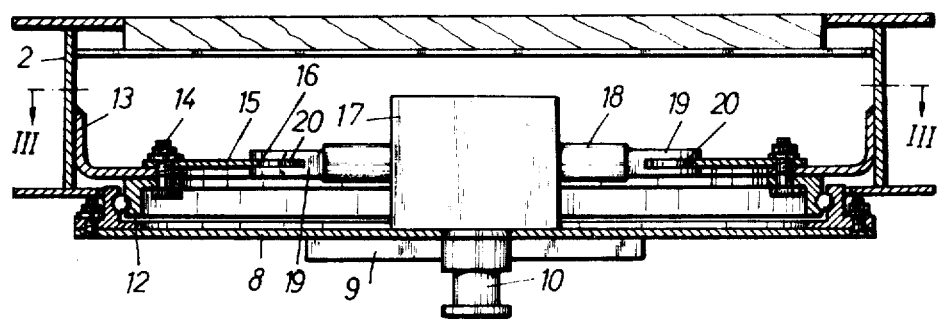
FIG. 2 is a section taken along the line II-II of FIG. 1 but on a larger scale than the latter.
Figure 3:
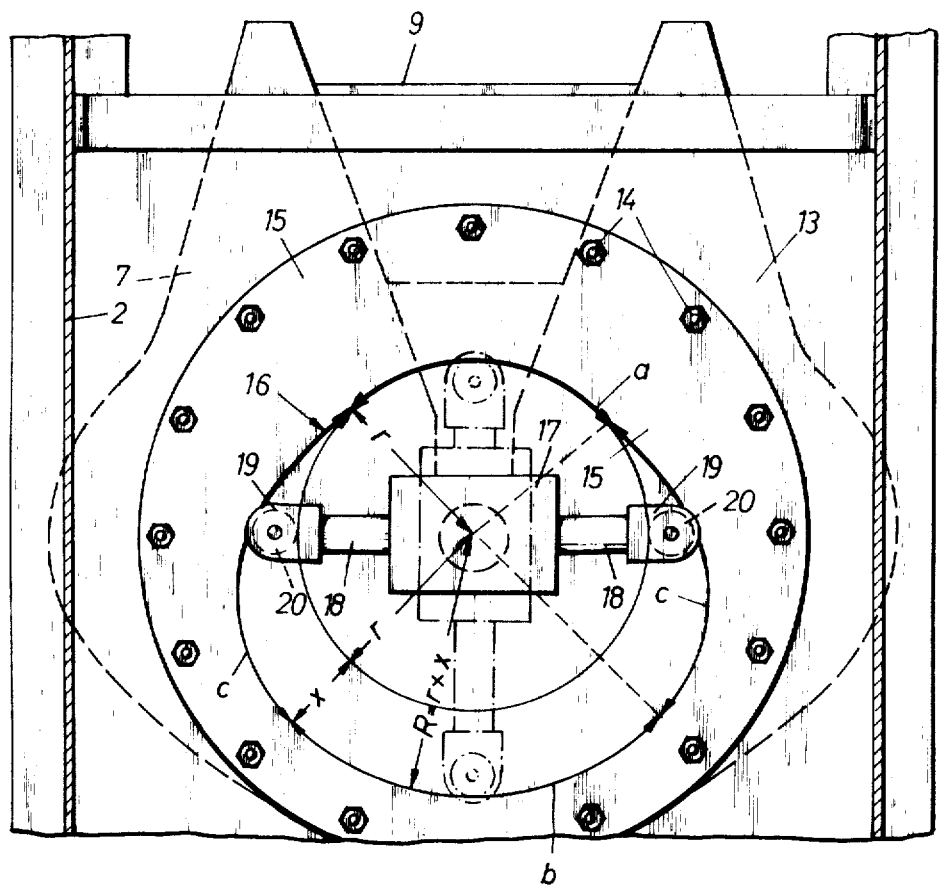
FIG. 3 represents a section taken along the line III-III of FIG. 2.
Figure 4:
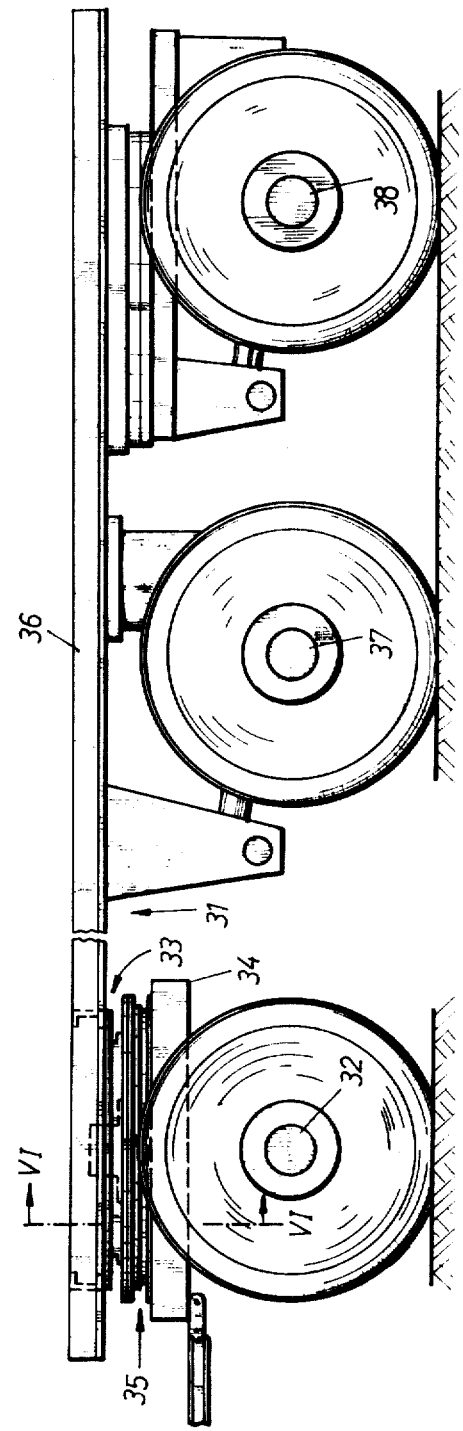
FIG. 4 is a side view of a trailer with front axle and pivot mounting or truck.
Figure 5:
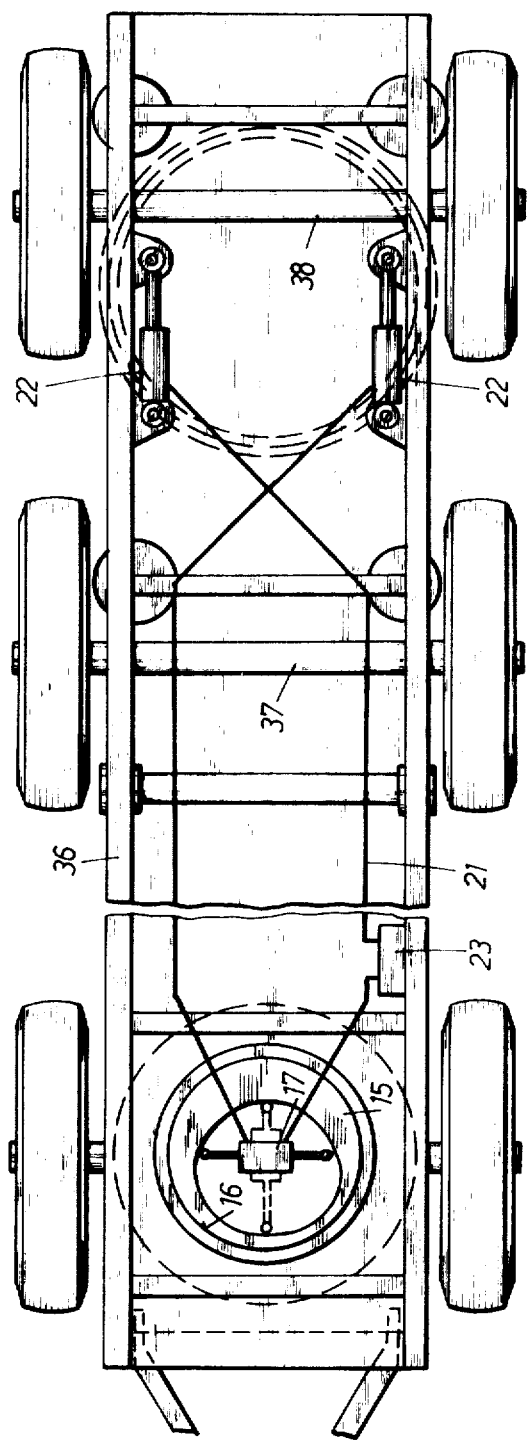
FIG. 5 shows a top view of FIG. 4.

Referring now to the drawings in detail and, more specifically, to the semitrailer 1 illustrated in FIGS. 1 to 3, this semitrailer 1 consists primarily of a frame 2, a rigid rear axle 3, a rear steering axle 4, and a saddle coupling 5. The saddle coupling 5 consists primarily of a coupling plate 7 which is mounted on a main frame 6 of a nonillustrated tractor, of a sliding plate 8 with a follower wedge 9 and with a kingpin 10. A driving axle 11 of the tractor is connected which is offset toward the rear and is located below the frame 6 underneath the saddle coupling 5.

The sliding plate 8 of the saddle coupling 5 is, by means of a ball turntable 12 and a holding plate 13, rotatably connected to the frame 2 of the semitrailer 1. Connected to the holding plate 13 by means of screws 14 is a cam disc 15 which on its inside forms a cam surface 16. The holding plate 13 extends into the interior of the ball turntable 12. The control cam surface 16 comprises a circular section $a$ with the radius $r$, a circular arc section $b$ with the radius R, and two stroke cam sections $c$ which forms an image to each other and establish the transition between the two circular arc sections $a, b$.

Connected to the sliding plate 8 of the saddle coupling 5 and coaxially arranged with regard to the kingpin 10 is a double-acting transmitting cylinder 17 having the piston rods 18 equipped with heads 19 and rollers 20 which are adapted to roll over the cam surface 16 of the cam disc 15. The two cylinder chambers of the transmitting cylinder 17 are, through a control conduit 21, connected to the receiving cylinders 22 which are linked between the frame 2 and the steering axle 4. Interposed in the control conduit 21 is a storage container 23 for the oil under pressure with a nonillustrated gas-filled compensating container.

OPERATION

The automatic steering arrangement illustrated in FIGS. 1—3 operates as follows. With a turning angle of the main frame 6 of the nonillustrated tractor relative to the frame of the semitrailer 1, the guiding plate 8 is pivoted by the coupling plate 7 at its follower wedge 9 relative to the frame 2 of the semitrailer 1. The rollers 20 of the piston rod 18 of the transmitting cylinder 17 are conveyed along the control cam surface 16. The reduction or increase in the volume in the cylinder chambers of the transmitting cylinder 17 is through the intervention of the control conduit 21 conveyed to the rear receiving cylinders 22 so that the steering axle 4 will turn anglewise in conformity with the position of the transmitting cylinder 17 relative to the stroke curve section $c$ on the control cam surface 16. Inasmuch as the volume of the cylinder chambers in the transmitting cylinder 17 relate to the volume in the receiving cylinders 22 at the ratio 2:1, it will be appreciated that a maximum steering angle of the steering axle 4 of 20° corresponds to an angle of the main frame 6 of 40°. When the main frame 6 is angularly turned beyond an angle of 40° so that the transmitting cylinder 17 is within the region of the circular arc sections $a, b$ of the control cam surface 16, the volume in the transmitting cylinder and the receiving cylinders does not change. Only when the transmitting cylinder 17 is again returned to the region of the stroke cam section $c$, this return position is also followed by the return of the steering axle 4 to its basic position.

The trailer 31 illustrated in FIGS. 4—7 comprises primarily a front end 32, a turntable 33 composed of an auxiliary frame 34, a turntable 35 and a frame 36 as well as a rigid rear axle 37 and a steering axle 38.

With this embodiment, the cam disc 15 of the hydraulic automatic steering arrangement according to the invention is connected to the frame 36 by means of the upper turning ring of the turntable ring 35. The transmitting cylinder 17 is mounted on a connecting plate 39 which, together with the lower rotatable ring of the turntable 35, is connected to the axle frame 34. The rear receiving cylinders 22 are again pivotally connected between the frame 36 and the steering axle 38. The function of the hydraulic automatic steering arrangement of this embodiment is identical to that described above for the semitrailer.

With the embodiment of a follower steering axle 41 illustrated in FIG. 8 and with steering levers 43 pivotally connected to the axle body 42 and with a tie bar 44 connecting the same, the two receiving cylinders 22 are pivotally connected between a support 45 connected to the axle body 42 and the steering levers 43.

The follower steering axle 41 can be secured below the frame 36 in place of the steering axle 38 without the necessity of a turntable or ring mounting. The steering or control of the follower steering axle 41 results by means of a receiving cylinder 22 for the embodiment of FIG. 8 the same as the steering or control of the steering axle 38 in FIG. 5. It is noted that fastening plates or consoles can be added to the axle body 42 at each lower angular corner immediately adjoining the wheels shown in FIG. 8 in a well-known manner. An arrow directed upwardly represents how this axle structure is to be used relative to a trailer and operated with trailers of a type referred to in the preceding disclosure and drawings.

It is, of course, to be understood that the present invention is, by no means, limited to the particular constructions shown in the drawings but also comprises any modifications within the scope of the appended claims.

What I claim is:

1. A steering device for a trailer vehicle: said vehicle having a frame with steerable rear wheels and a turntable at the front, said turntable comprising a first member fixed to the vehicle frame and a second member pivoted to the first member and adapted to be fixed to a towing vehicle so that when the towing vehicle turns the said second member will turn relative to said first member, fluid-operable receiving piston cylinder means connected between said frame and said rear wheels for causing steering movements of the said rear wheels in response to a supply of fluid to said receiving piston cylinder means, sending piston cylinder means connected in circuit with said receiving piston cylinder means and having a cylinder means connected to one of said first and second members and also having piston means, and cam means connected to the other of said first and second members having a cam surface engaging said piston means and operable to displace said piston means in said cylinder means in response to relative rotation of said first and second members whereby turning of said towing vehicle will be accompanied by steering movement of the said rear wheels of the trailer vehicle, said piston means being double ended and said cam surface presenting a closed endless path engaging both ends of said piston means for positive actuation of the said piston means in both directions of movement thereof in said cylinder means.

2. A steering device according to claim 1, in which said cam surface has two diametrally opposed circular arc regions of respectively different radii and of the same angular extent, and two stroke regions connecting said arc regions at their adjacent ends and in the form of mirror images of each other.

3. A steering device according to claim 2, in which said stroke regions each extend over about 80° of the circumference of the cam surface measured as a central angle.

4. A steering device according to claim 1, in which said sending piston cylinder means is double acting and has each end thereof connected to a respective one of said receiving piston cylinder means.

5. A steering device according to claim 4, in which each receiving piston cylinder means is single acting and is connected by a single conduit with the pertaining end of said sending piston cylinder means.

6. A steering device according to claim 5, in which said receiving piston cylinder means and said transmitting piston cylinder means are so interconnected that turning of the towing vehicle in one direction results in turning of said rear wheels of the trailer vehicle in the opposite direction.

7. A steering device according to claim 1, which includes a roller on each end of said piston means engaging said cam surface.

8. A steering device according to claim 1, in which said first and second members form a part of a saddle coupling comprising a coupling plate, a sliding plate, a follower part and a kingpin, said cylinder means and said kingpin being connected to said sliding plate with the axis of the kingpin which forms the axis of which the towing vehicle turns relative to the trailer vehicle passing through the midpoint of the axis of said cylinder means.

9. A steering device according to claim 8, in which said sliding plate forms said second member, and antifriction means connecting said sliding plate to the said first member.

10. A steering device according to claim 9, in which a common holding plate is provided connecting said first member and said cam means to the frame of said trailer vehicle.

11. A steering device according to claim 1, in which the ratio of the size of the sending piston cylinder means relative to that of the receiving piston cylinder means is about 2:1.

12. A steering device according to claim 1, in which said trailer vehicle is provided with a drawbar for connection to a towing vehicle, said drawbar being connected to said second member, said first member being connected to the frame of the trailer vehicle, said sending piston cylinder means being connected to said second member and said cam means being connected to said first member.